(12) United States Patent
Nguyen et al.

(10) Patent No.: US 8,456,423 B2
(45) Date of Patent: Jun. 4, 2013

(54) APPARATUS AND METHOD FOR PROVIDING WIRELESS COMMUNICATION AND FM TRANSCEIVER OPERATION FOR A WIRELESS COMPUTER MOUSE

(75) Inventors: Hien Nguyen, San Diego, CA (US); Yi Zhou, San Diego, CA (US); Vijay Parpia, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 780 days.

(21) Appl. No.: 12/575,358

(22) Filed: Oct. 7, 2009

(65) Prior Publication Data

US 2011/0080343 A1 Apr. 7, 2011

(51) Int. Cl.
G09G 5/08 (2006.01)

(52) U.S. Cl.
USPC ............................................ 345/163; 463/37

(58) Field of Classification Search
USPC ............ 345/156, 157, 161, 163–167; 463/37, 463/38
See application file for complete search history.

(56) References Cited

U.S. PATENT DOCUMENTS

| | | | | |
|---|---|---|---|---|
| 7,397,462 B2 * | 7/2008 | Wu | ................................ | 345/163 |
| 2004/0054825 A1 | 3/2004 | Wang | | |
| 2004/0155866 A1 | 8/2004 | Tung | | |
| 2004/0183781 A1 | 9/2004 | Ye et al. | | |
| 2006/0007151 A1 | 1/2006 | Ram | | |
| 2007/0273650 A1 | 11/2007 | Wu et al. | | |
| 2008/0088597 A1 * | 4/2008 | Prest et al. | ..................... | 345/173 |
| 2009/0137269 A1 | 5/2009 | Chung | | |
| 2010/0033423 A1 * | 2/2010 | Iio | ................................. | 345/156 |
| 2010/0066679 A1 * | 3/2010 | Pan | ................................ | 345/166 |
| 2010/0253617 A1 * | 10/2010 | Iio et al. | ......................... | 345/156 |
| 2010/0265172 A1 * | 10/2010 | Sadahiro | ....................... | 345/157 |
| 2011/0001697 A1 * | 1/2011 | Mao | ............................ | 345/157 |
| 2011/0045770 A1 * | 2/2011 | Nguyen et al. | ............... | 455/41.2 |

FOREIGN PATENT DOCUMENTS

| WO | WO02/061673 | 8/2002 |
|---|---|---|
| WO | WO-02-061673 A1 | 8/2002 |

OTHER PUBLICATIONS

Navilock BT-451 Bluetooth GPS Mouse, 2006, http://gadgets.softpedia.com/gadgets/GPS-RFID-The_Navilock-BT-451-Bluetooth-GPS-Mouse-5040.html.

* cited by examiner

*Primary Examiner* — Tom Sheng
(74) *Attorney, Agent, or Firm* — Sony Corporation of America

(57) ABSTRACT

Wireless computer mouse operation may be provided by receiving a user detection signal from a sensor of the wireless computer mouse to determine the presence of a user. In one embodiment, an operation mode of the wireless computer mouse may be determined by a controller based, at least in part, on the user detection signal. Thereafter, the controller can enable at least one of a short range wireless communication module and a FM transceiver of the wireless computer mouse based on the operation mode determined by the controller.

5 Claims, 10 Drawing Sheets

APPARATUS AND METHOD FOR PROVIDING WIRELESS COMMUNICATION AND FM TRANSCEIVER OPERATION FOR A WIRELESS COMPUTER MOUSE

FIELD OF THE INVENTION

The present invention relates generally to computer input devices, and more particularly to a wireless computer mouse configured for short range wireless communication and configured for FM transceiver operation.

BACKGROUND OF THE INVENTION

Computer peripherals, such as a computer mouse or keyboard, have traditionally been configured to input commands to a single personal computer. A conventional computer mouse typically operates as a pointing device. In order for a conventional mouse to operate with a second or different computer, a user is typically required to couple the mouse to the separate device and/or program the mouse for operation with the device. As a result, a conventional computer mouse typically operates with one device. Further, the conventional computer mouse is typically configured to operate with only one computing device at a time. Thus, the conventional computer mouse is not configured to operate independently from other computing devices. Similarly, other computer peripherals are generally configured to operate as an accessory with a single computer. Unfortunately, and particularly in the case with computer peripherals, the peripheral devices are not configured to operate with different types of devices. As a result, users are required to carry multiple stand-alone products.

Thus, there is a need in the art for systems and methods for improved operation capabilities of computer peripheral devices.

BRIEF SUMMARY OF THE INVENTION

Disclosed and claimed herein are methods and apparatus for operation of a wireless computer mouse. In one embodiment, a method includes receiving a user detection signal from a sensor of the wireless computer mouse to determine the presence of a user, determining an operation mode of the wireless computer mouse based at least in part, on the user detection signal, and enabling, by the controller, at least one of a short range wireless communication module and a FM transceiver of the wireless computer mouse based on the operation mode determined by the controller.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1A:
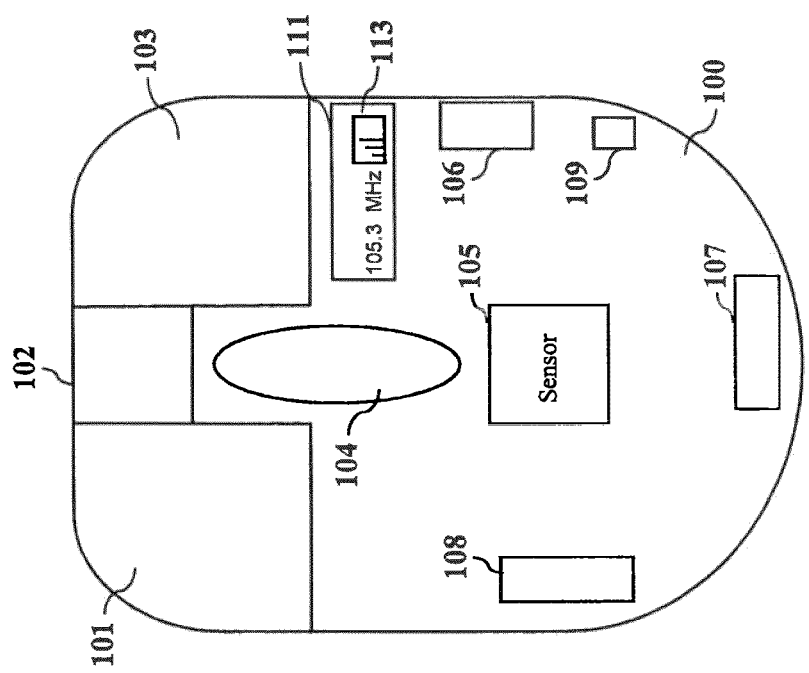
FIGS. 1A-1B depict a wireless computer mouse according to one or more embodiments of the invention.

One aspect of the present invention relates to operation of a wireless computer mouse. In one embodiment, a process is provided to determine one or more operation modes such that a short range wireless communication module and frequency modulation (FM) transceiver of the wireless computer mouse may be enabled and/or disabled. An operation mode may allow for simultaneous operation of the short range wireless communication module and FM transceiver. Additionally, one or more operation modes of the wireless computer mouse may allow for stand-alone operation of one of the short range wireless communication module and FM transceiver. In certain embodiments, one or more operation modes may be based on user detection signals of a sensor of the wireless computer mouse, an activation sequence of one or more mouse buttons and/or a controller signal. In that fashion, the operation modes may allow for more efficient operation of a wireless computer mouse and can result in lower power consumption.

Moreover, it should be appreciated that the present disclosure may relate to devices configured for short range wireless communication (e.g., Bluetooth™) including computer devices, personal communication devices, media devices and communication devices in general.

In one embodiment, a wireless computer mouse is configured for short range wireless communication and configured to receive one or more FM signals. The wireless computer mouse may further include a sensor to detect the presence of a user within close proximity of the mouse.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc.

Exemplary Embodiments

Figure 1B:
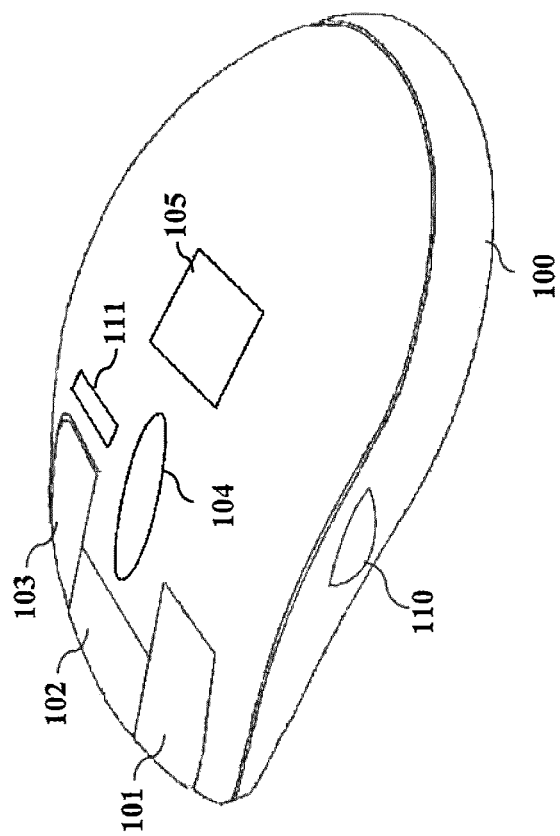

Referring now to the figures, FIGS. 1A-1B depict a wireless computer mouse according to one or more embodiments of the invention. With Reference to FIG. 1A, depicted is a wireless computer mouse 100 according to one embodiment of the invention. As shown, wireless computer mouse 100 includes left-click button 101, middle-click button 102 and right-click button 103. Mouse 100 further includes scroll/wheel button 104. According to one embodiment, mouse 100 includes sensor 105 configured to detect the presence of a user. Sensor 105 may relate to a reflective sensor configured to detect the hand and/or body part of a user in close proximity to mouse 100. By way of example, sensor 105 may be configured to detect a hand of a user within two inches of the sensor according to an exemplary embodiment. However, sensor 105 may be configured to detect other objects within similar or different ranges. According to another embodiment, sensor 105 may be configured to detect a user presence based on lighting conditions. For example, sensor 105 may be configured to adjust a detection threshold depending on ambient lighting conditions. Similarly, it should also be appreciated that sensor 105 is not limited to reflective sensors and may relate to other types of sensors. In certain embodiments, mouse 100 may further include one or more sensors to detect motion, such as user manipulation, as is well known in the art. By way of example, mouse 100 may include an optical source (e.g., laser, LED, etc.) and detector (not shown) to track movement.

According to one embodiment of the invention, mouse 100 may be configured to receive one or more FM signals using antenna 106. FM broadcast data such audio data, news and video may be received by mouse 100. Mouse 100 may be configured to output the received FM data to an external device as will be described in more detail below with reference to FIG. 5. According to another embodiment, selection of a frequency and/or channel may be performed by user activation of buttons 101-104. As will be described in more detail below with respect to FIG. 7, the mouse may be configured to tune to one or more preset frequencies and may additionally allow for a user to scan and/or select particular frequencies/channels. In an exemplary embodiment, mouse 100 may be configured to receive broadcast frequencies within the exemplary range of 87.5-108.0 MHz. However, it should also be appreciated that additional frequencies may be detected. Antenna 106 can be mounted within the body of mouse 100 in one embodiment. However, it should also be appreciated that antenna 106 may have include other configurations for reception and transmission of FM signals.

In one embodiment, mouse 100 may be configured to display a selected frequency in display window 111. Display window 111 may be configured to display text including a particular FM frequency and/or identifiers of a broadcast source. Display window 111 may additionally include signal strength indicator 113 to display the relative signal strength of a received FM broadcast channel. In one embodiment, display window 111 may be coupled to a controller of mouse 100. Alternatively it may also be appreciated that display window 111 may be coupled to an FM transceiver of mouse 100.

Mouse 100 additionally includes short range wireless communication antennas 107 and 108 configured for short range wireless communication (e.g., Bluetooth™) with one or more devices. Antennas 107 and 108 may be configured to transmit one or more tracking signals, transmit activation of buttons 101-104, and/or data received by antenna 106. As shown in FIG. 1A, antennas 107 and 108 are mounted within the housing/body of mouse 100. According to one exemplary embodiment, antennas may receive and transmit data at a frequency at or between 2.4 GHz and 2.4835 GHz. When activated, a short range wireless communication module can transmit data indicating mouse movement to another device. For example, mouse 100 may be configured to interoperate with one or more of a computer, personal digital assistant ("PDA"), media player, mobile communication device, earpiece, communication port, digital camera, game console, etc. Although shown as separate, antennas 107 and 108 may alternatively be replaced by a single antenna and/or a different configuration.

In another embodiment, a controller (not shown in FIG. 1A) of mouse 100 may be configured to detect activation of buttons 101-104 to determine one or more operation modes of mouse 100. In certain embodiments, an activation sequence of buttons 101-104 may override a current operation mode. According to another embodiment, mouse 100 may include switch 109 configured to enable simultaneous operation of short range wireless communication and receiving FM data. Mouse 100 may further include an on/off switch (not shown in FIG. 1A). Although FIG. 1A describes a wireless computer mouse, it should equally be appreciated that the invention may be directed to other devices.

With Reference to FIG. 1B, a perspective view is depicted of wireless computer mouse 100 according to one embodiment of the invention. Mouse 100 may include button 110 configured for selection of an FM channel for antenna 106. In an exemplary embodiment, button 110 may relate to a scroll/click wheel. Manipulation of button 110 can result in display of a particular frequency in window 111. Button 110 may additionally be configured as an on/off button for FM transceiver functions of mouse 100.

Figure 2:
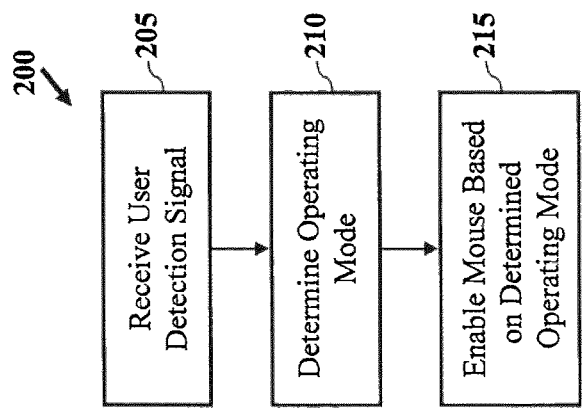
FIG. 2 depicts a process for wireless computer mouse operation according to one embodiment.

Referring now to FIG. 2, a process is depicted for operation of a wireless computer mouse (e.g., wireless computer mouse 100) according to one or more embodiments of the invention. Process 200 may be initiated during activation and/or startup of a mouse. A controller of the mouse receives a user detection signal from a sensor (e.g., sensor 105) at block 205. The controller can determine an operating mode of the mouse at block 210 based on the received detection signal. As will be described in further detail below with regard to FIG. 4, the controller may enable one or more operating modes based on a user detection signal. In certain embodiments, the controller may further receive one or more signals to determine an operation mode. For example, a user may override a determined operation mode by activating a sequence of buttons (e.g., buttons 101-104) and/or user detection signals. Alternatively, or in combination, manual override may be initiated by a user depressing a button (e.g., buttons 101-104) for a predetermined period of time. Similarly, override of an operation mode may be based on the position of a dual mode switch (e.g., switch 109) to indicate simultaneous operation of a short range wireless communication module and FM transceiver. At block 215, the controller enables the mouse based on the determined operation mode.

Figure 3A:
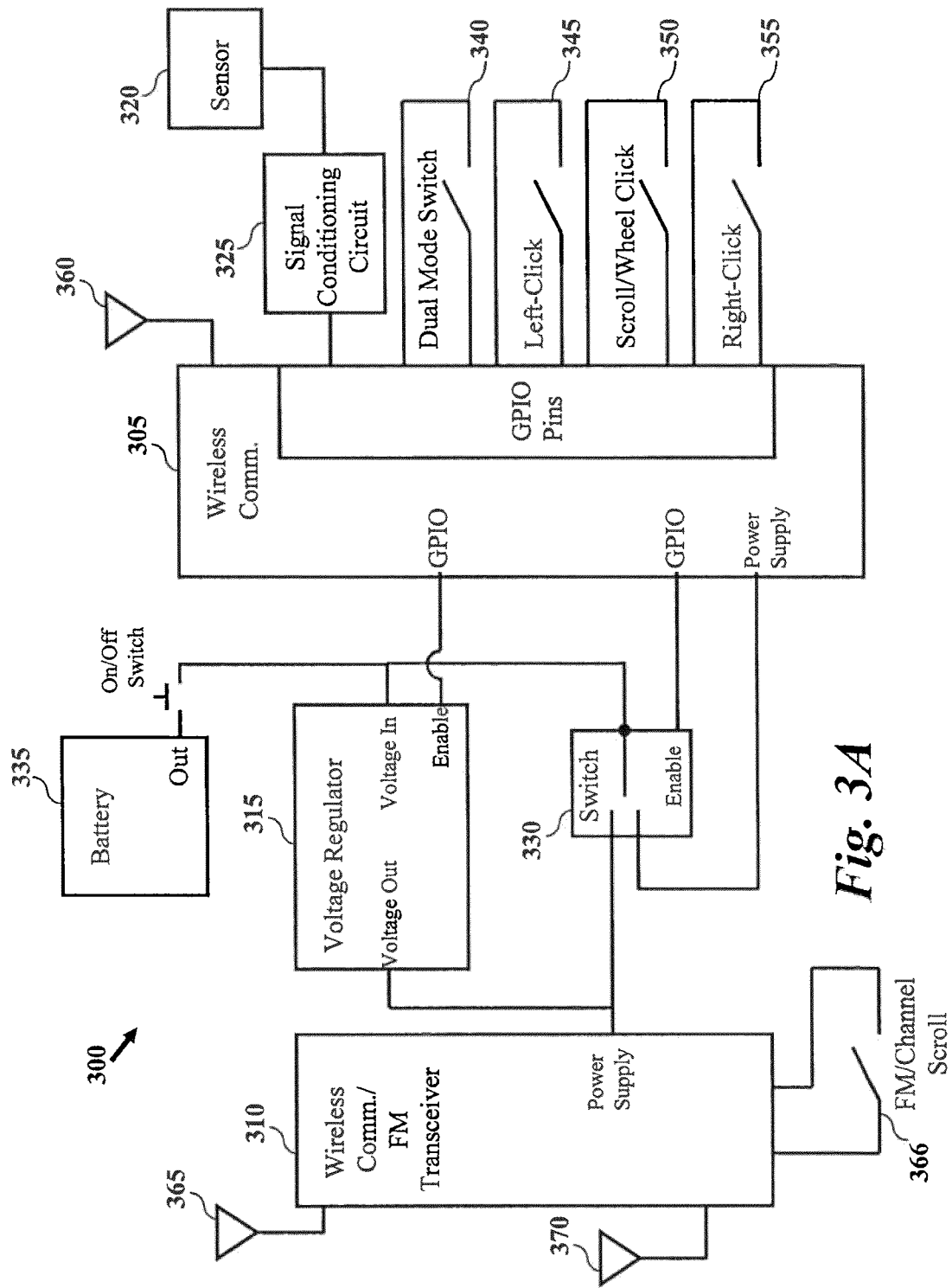
FIG. 3A depicts a simplified block diagram of a wireless computer mouse according to one embodiment.
Figure 3B:
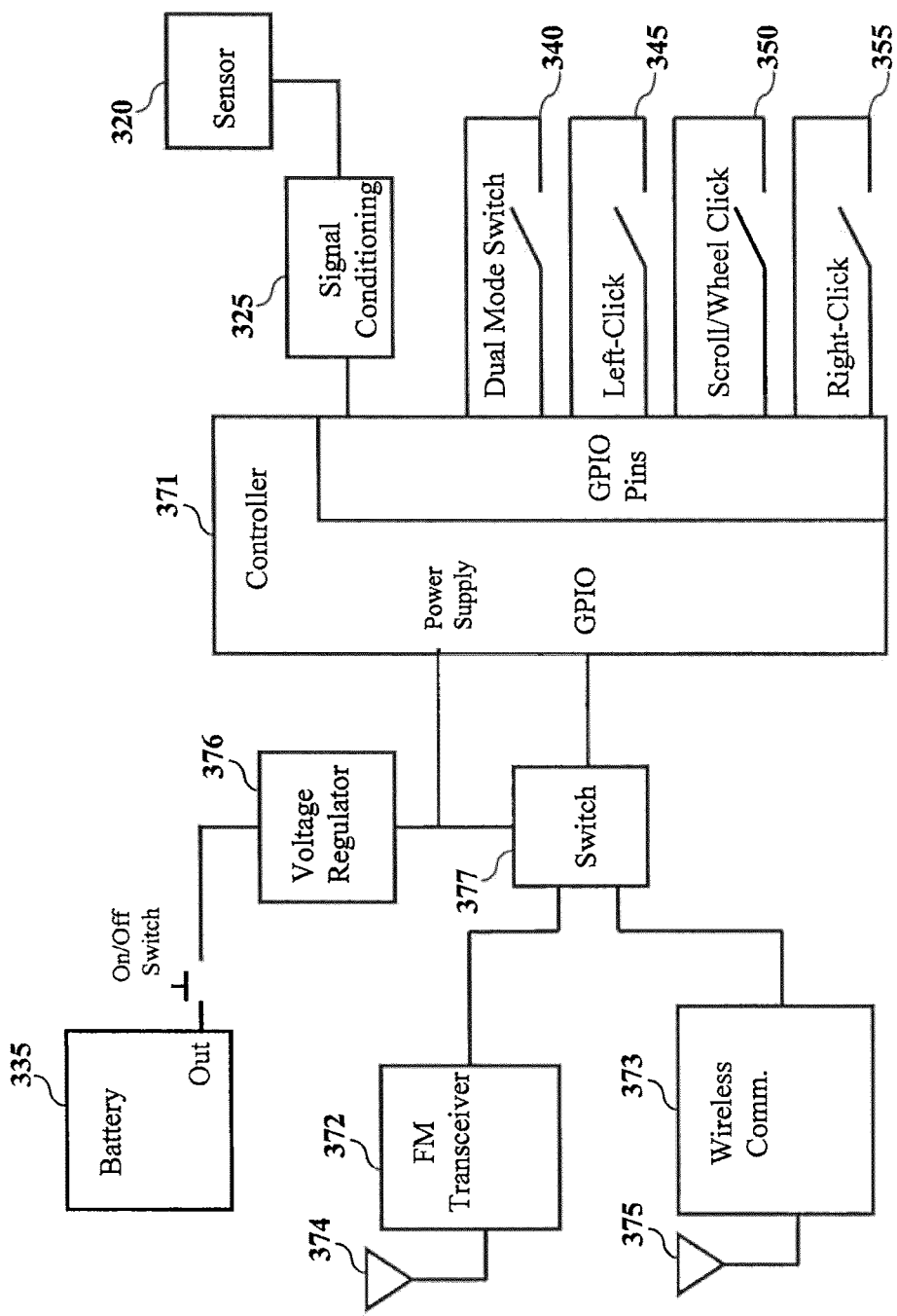
FIG. 3B depicts a simplified block diagram of a wireless computer mouse according to one embodiment.

FIGS. 3A-3B depict simplified block diagrams of the wireless computer mouse of FIGS. 1A-1B are depicted according to one or more embodiments of the invention.

Referring first to FIG. 3A, wireless computer mouse may include wireless communication chipset 305 configured to detect and transmit one or more signals related to operation of the mouse. According to one embodiment, the wireless computer mouse may additionally include wireless communication/FM transceiver chipset 310 configured to receive FM broadcast data and transmit one or more signals related to the data. According to another embodiment, power may be supplied to one or more of chipsets 305 and 310 based on an operation mode.

As shown in FIG. 3A, battery 335 may supply voltage to voltage regulator 315 when an on/off switch is activated. Voltage regulator 315 may be configured to supply voltage to at least one of chipsets 305 and 310 based on one or more control signals received on an enable pin of regulator and control of switch 330. According to one embodiment, wireless communication chipset 305 may be configured to control voltage regulator 315 and switch 330.

Wireless communication chipset 305 may be configured to detect a user within close proximity to the wireless computer mouse based on one or more signals output by sensor 320 (e.g., sensor 105). Signal conditioning circuit 325 may be configured to output one or more voltage levels based on output of sensor 320. In that fashion one or more operation modes may be determined. Chipset 305 is additionally coupled to dual mode switch 340 which may be activated by a user to select dual mode operation of wireless communication chipset 305 and chipset 310. Chipset 305 may further be configured to output one or more control signals based on user input, including left-click 345, scroll/wheel click 350 and right-click 355. Although not shown in FIG. 3A, it should also be appreciated that wireless communication chipset 305 may additionally be configured to detect movement of the wireless computer mouse which may be transmitted via antenna 360. Control signals may be wireless transmitted by chipset 305 using antenna 360. Chipset 305 may be configured to wirelessly transmit signals based on a short range wireless communication protocol using a first profile.

Wireless communication/FM transceiver chipset 310 may be configured to receive FM signals using antenna 365 and may be configured to wirelessly transmit the data to an external device using antenna 370. In one embodiment, FM channel/scroll button 366 (e.g., button 110) may be configured for selection of an FM channel for antenna 365. According to another embodiment, chipset 310 may be configured to wirelessly transmit signals based on a short range wireless communication protocol using profile that is similar and/or distinct from the profile employed by chipset 310. Chipset 310 may employ one or more of an advanced audio distribution profile, headset profile and a wireless access profile for transmission of data to an external device.

Referring now to FIG. 3B, a simplified block diagram of a wireless computer mouse is depicted according to another embodiment of the invention. As shown, the wireless computer mouse (e.g., wireless computer mouse 100) includes a controller 371 electrically coupled to FM transceiver 372, wireless communication module 373, sensor 320 and switch 377. Controller 371 may be configured to enable at least one of FM transceiver 372 and wireless communication module 373 based on a determined operation mode. In one embodiment, controller 371 may output one or more control signals to switch 377 to supply operational power to FM transceiver 372 and wireless communication module 373. Accordingly, switch 377 may be configured to couple battery 335 to at least one of FM transceiver 372, wireless communication module 373 based on one or more control signals received from controller 371.

FM transceiver 372 may be configured to receive broadcasted data via antenna 374. In one embodiment, controller 371 may be configured to transmit broadcast data received by FM transceiver 372. In another embodiment, controller 371 may further be configured to output received FM data for transmission by wireless communication module 373 to a computer, PDA, or other device. In yet another embodiment, controller 371 may be configured to receive FM data by FM transceiver 372 via antenna 374 when wireless communication module 373 is disabled.

Wireless communication module 373 may be configured to receive and/or transmit data in conformance with a short range communication protocol (e.g., Bluetooth™) antenna 375. Data transmitted through antenna 375 may relate to movement of the mouse, user input and/or other data associated the wireless computer mouse.

Controller 371 may be configured to receive one or more signals from sensor 320 via signal conditioning circuitry 325. Signal conditioning circuitry 325 maybe configured for at least one of providing voltage level translation, conversion of voltage to current, and conditioning a detected signal for controller 371 (e.g. an analog to digital conversion). In one embodiment, sensor 320 relates to a reflective sensor configured to detect a user within close proximity (e.g., 1-4 inches) and/or in contact with a wireless computer mouse. In another embodiment, sensor 320 may detect lighting conditions and/or electromagnetic radiation having one or more frequencies. Sensor 320 may include a window or transparent section comprised of plastic, glass, or another material allowing electromagnetic radiation and/or an electrical signal to penetrate. It may also be appreciated that sensor 320 may be configured to sense temperature, pressure, and/or capacitance.

As shown in FIG. 3B, controller 371 includes one or more general purpose input output (GPIO) pins to couple controller 371 to one or more buttons of the wireless computer mouse including a dual mode switch 340, left-click button 345, scroll/wheel button 350 and right-click button 355. Dual mode switch 340 may be set by a user for simultaneous operation of FM transceiver 372 and wireless communication module 373. According to another embodiment, at least one of left-click button 345, scroll/wheel button 350 and right-click button 355 may be employed by a user to override a determined operation mode.

According to another embodiment, FM transceiver 372 of mouse 300 may be configured to receive FM data which may include one or more types of broadcast media (e.g., broadcast radio, music, news, update information, etc.). Further, as will be described below in more detail with respect to FIG. 6, wireless communication module 373 may be configured to transmit the received media to an external device.

The present disclosure is further directed to one or more processes for operation of a wireless computer mouse. FIGS. 4A-4D depict one or more processes which may be employed by the wireless computer mouse of FIGS. 1A-1B.

Figure 4A:
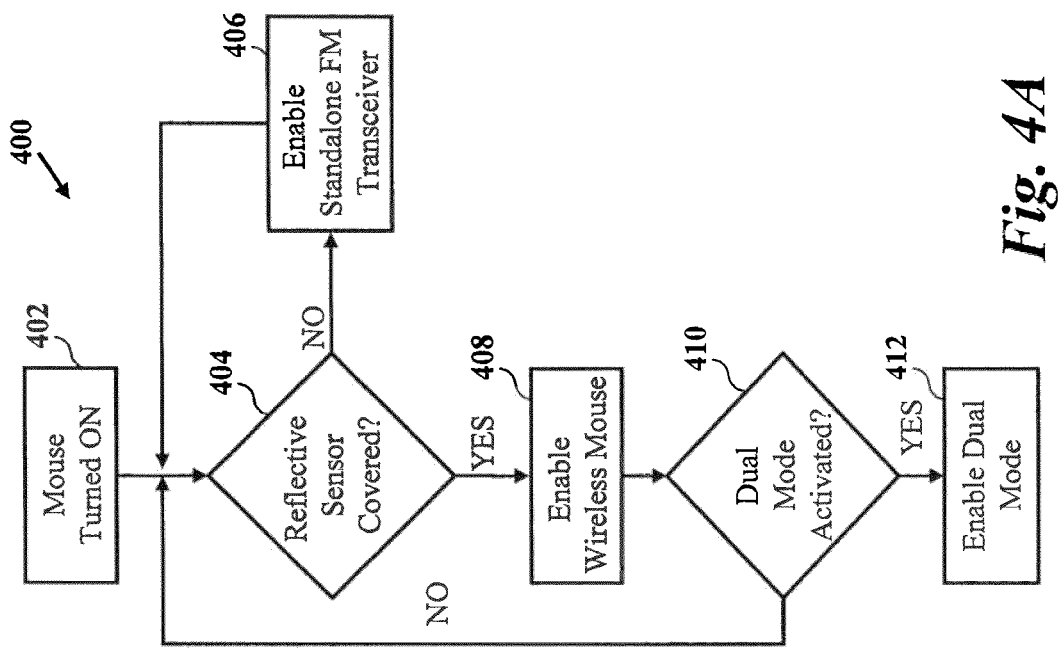
FIG. 4A depicts a process for enabling one or more operation modes according to one or more embodiments.

Referring first to FIG. 4A, process 400 is shown for determining an operation mode of a wireless computer mouse according to one embodiment. Process 400 may be initiated by a user turning on a mouse at decision block 402 and determining if a reflective sensor (e.g., sensor 105) is covered at decision block 404. When the sensor is not covered ("NO" path out of decision block 404), an operation mode for standalone operation of FM transceiver at block 406. When the sensor is covered ("YES" path out of decision block 404), an operation mode may be entered for wireless operation of the mouse (e.g., use as a pointing/clicking device) at block 408. Process 400 proceeds to determine if a dual mode is activated at decision block 410. When the dual mode is not activated ("NO" path out of decision block 410), process 400 proceeds to monitor if the sensor is covered at block 404. When the dual mode is activated ("YES" path out of decision block 410), an operation mode may be entered for wireless operation of the mouse and FM transceiver functions at block 412.

Figure 4B:
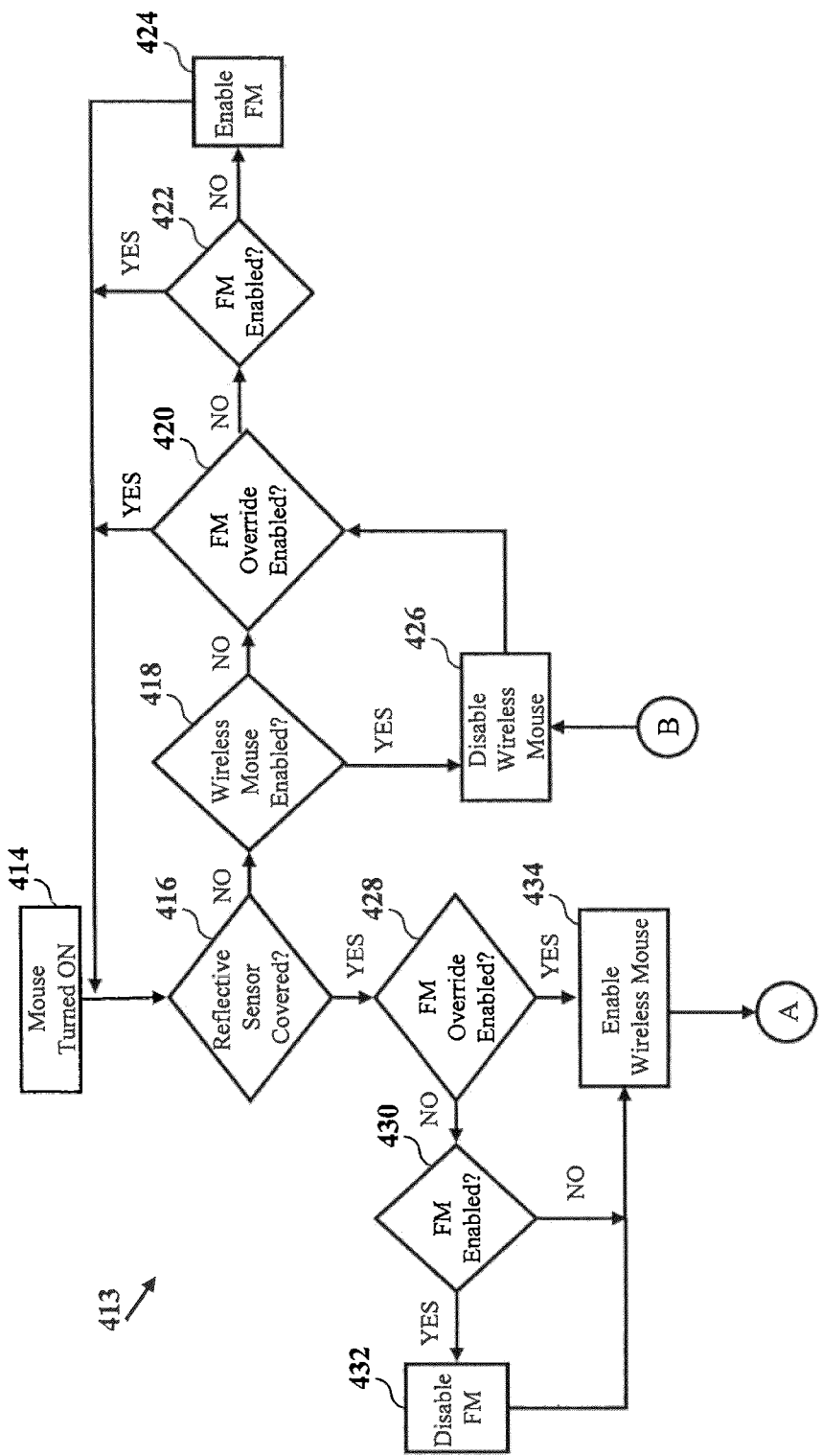
FIG. 4B depicts a process for enabling one or more operation modes according to one or more embodiments.

Referring now to FIG. 4B, process 413 is shown for operation a wireless computer mouse according to one embodiment. Process 413 may be initiated by a user turning on a mouse at decision block 414 and determining if a reflective sensor (e.g., sensor 105) is covered at decision block 416. When the sensor is not covered ("NO" path out of decision block 416), process 413 proceeds to determine if the wireless mouse is enabled at decision block 418. When wireless mouse operation is enabled ("YES" path out of decision block 418), the wireless mouse operation may be disabled at block 426. When wireless mouse operation is no not enabled ("NO" path out of decision block 418) and/or the wireless mouse operation has been disabled at block 426, process 413 may determine if a FM transceiver override operation has been enabled at block 420. An FM override mode may be enabled to enable a FM transceiver according to one embodiment. When the FM override mode is enabled, ("YES" path out of decision block 420), process 413 returns to decision block 416. When the FM override mode is not enabled, ("NO" path out of decision block 420), process 413 checks if the FM transceiver is enabled at decision block 422. When the FM transceiver is enabled, ("YES" path out of decision block 422), process 413 returns to decision block 416. When the FM transceiver is not enabled, ("NO" path out of decision block 422), the FM transceiver is enabled at block 424.

Returning to decision block 416, when the sensor is covered ("YES" path out of decision block 416), process 413 proceeds to determine if the FM override operation has been performed at block 428. When the FM override mode is not enabled, ("NO" path out of decision block 428), process 413 checks if the FM transceiver is enabled at decision block 430. When the FM transceiver is enabled, ("YES" path out of decision block 430), the FM transceiver may be disabled at block 432. When the FM transceiver is not enabled, ("NO" path out of decision block 430) and/or when the FM override mode is not enabled, ("NO" path out of decision block 420), the wireless mouse may be enabled at block 434.

Process 413 proceeds to determine if the FM override mode is enabled at decision block 436. When the FM override mode is enabled, ("YES" path out of decision block 436), process 413 determines if the reflective sensor is covered at decision block 438. When the FM override mode is not enabled, ("NO" path out of decision block 436), process 413 determines if a dual mode switch (e.g., switch 109) is activated/toggled at decision block 440. When the dual mode switch is not activated/toggled ("NO" path out of decision block 440), process 413 returns to decision block 438. When the dual mode switch is activated/toggled ("YES" path out of decision block 440), process 413 determines if the dual mode is enabled at decision block 442. When the dual mode is enabled ("YES" path out of decision block 442), process 413 returns to decision block 438. When the dual mode is not enabled ("NO" path out of decision block 442), process 413 enables the dual mode at block 444. At decision block 438, when the reflective sensor is covered ("YES" path out of decision block 438), process 413 proceeds to decision block 436. When the reflective sensor is not covered ("NO" path out of decision block 438), process 413 proceeds to block 426 described above.

Figures 4B, 4C:
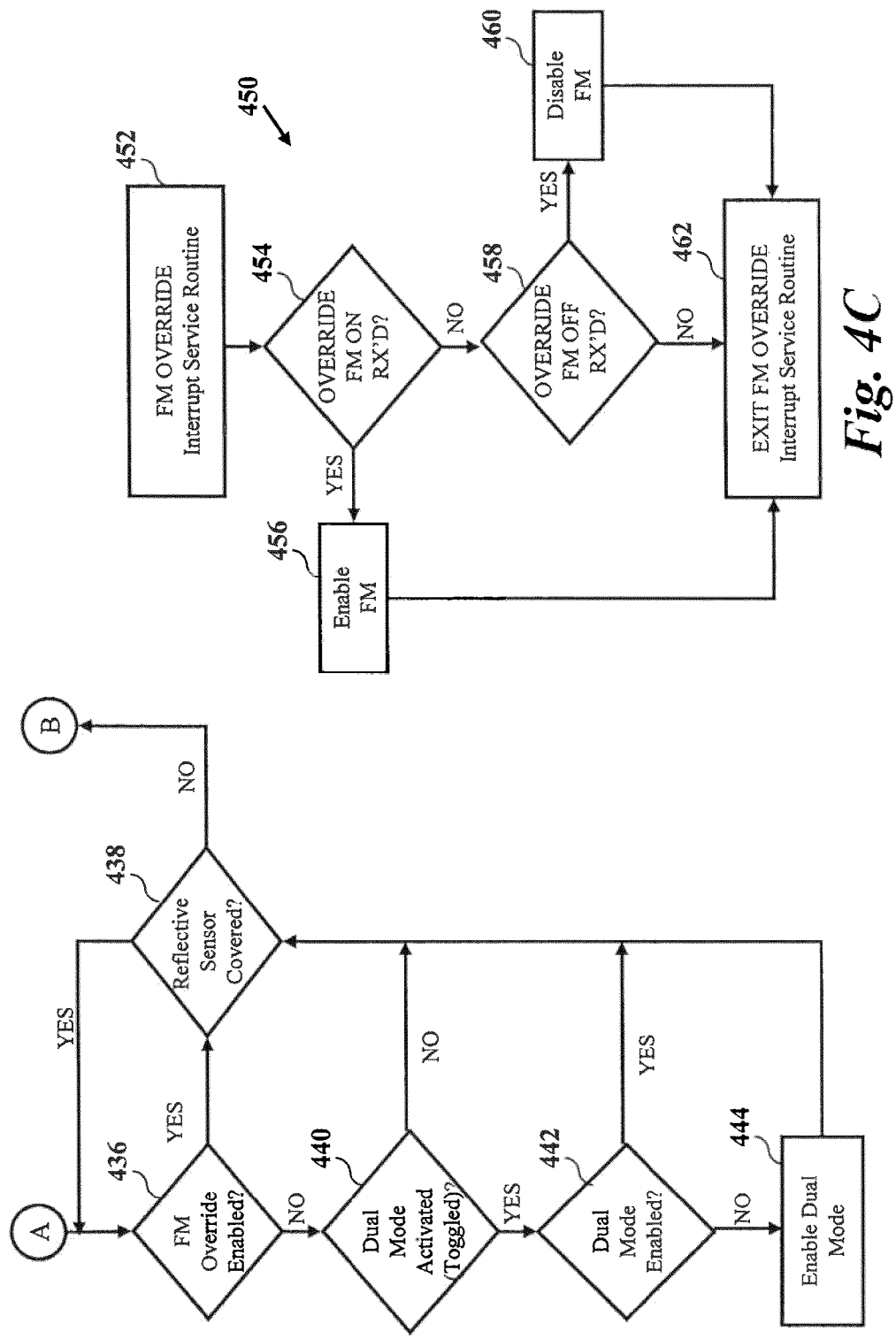
FIG. 4C depicts a process for enabling one or more operation modes according to one or more embodiments.

Referring now to FIG. 4C, process 450 depicts override (e.g., manually configuring) of a FM transceiver of the wireless computer mouse of FIGS. 1A-1B according to one embodiment. FM override interrupt service routine ("FM ISR") 452 may be initiated by a user overriding the FM on or off at block 452. Once FM ISR 452 is called, process 450 proceeds to determine whether the user manually configured the FM transceiver of the wireless computer mouse at decision block 454. When the user manually configured the FM transceiver of the wireless computer mouse ("YES" path out of decision block 454), FM transceiver of the wireless computer mouse may be enabled at block 456. When the user did not manually configure the FM transceiver of the wireless computer mouse ("NO" path out of decision block 454), process 450 proceeds to decision block 458 to determine whether the user manually configured the FM transceiver off. When the user manually configured the FM transceiver to be off ("YES" path out of decision block 458), the FM transceiver is disabled at block 460. When the user did not manually configured the FM transceiver to be off ("NO" path out of decision block 458), process 450 exits the FM ISR at block 462.

Figure 4D:
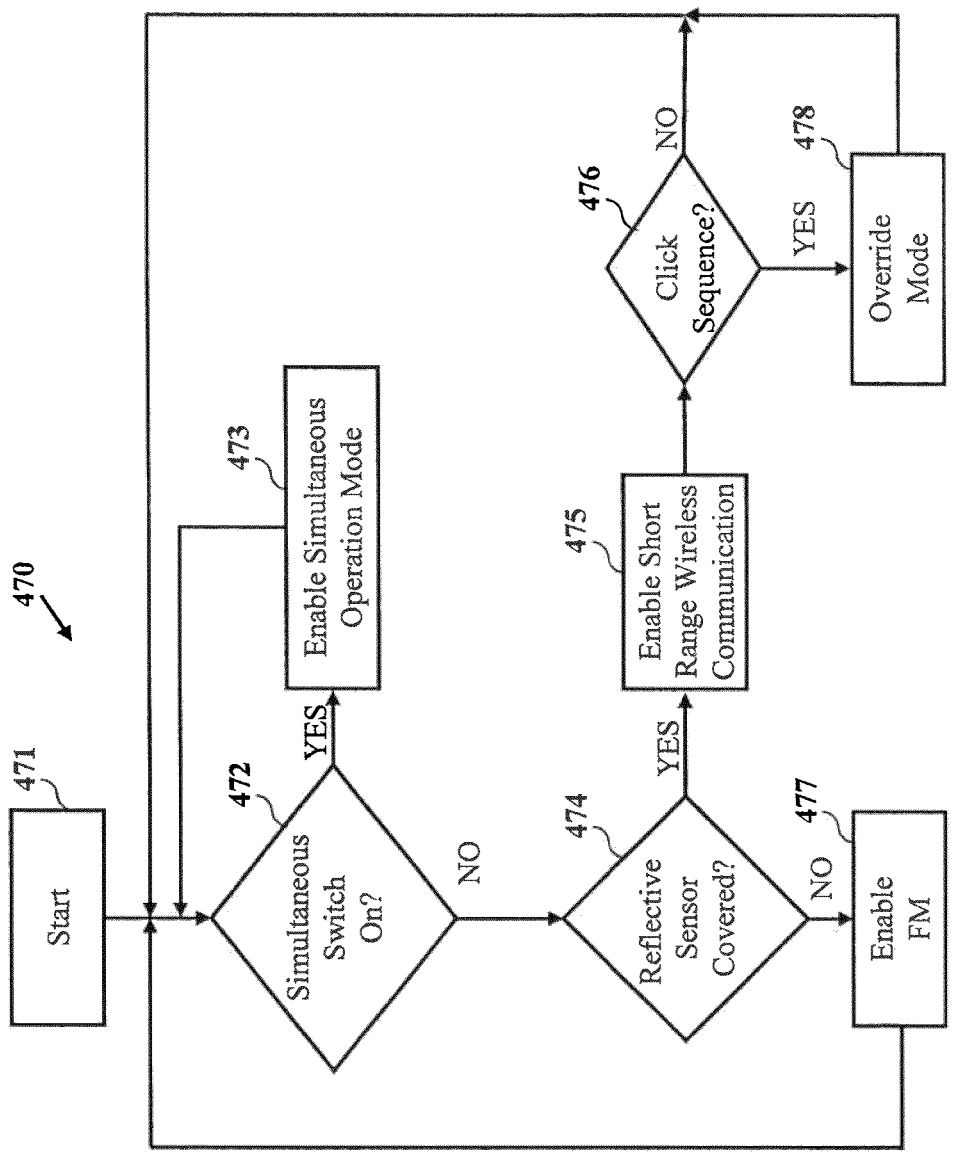
FIG. 4D depicts a process for enabling one or more operation modes according to one or more embodiments.

Referring now to FIG. 4D, a process is shown for enabling operation modes of a wireless computer mouse of FIG. 3. Process 470 may be initiated at start block 471. In one embodiment, process 470 may be initiated during power up of the mouse. In another embodiment, process 470 may be initiated when an input is received by the mouse (e.g., movement, click, user detection signal, etc.). As shown, a controller (e.g., controller 305) of the mouse determines if a dual mode switch (e.g., switch 340) is switched in an on position at decision block 472. When the switch is switched to an on position ("YES" path out of decision bock 472), the controller enables simultaneous operation of a wireless communication module and FM transceiver at block 473. When the switch is turned off ("NO" path out of decision block 472) the controller determines if a reflective sensor (e.g., sensor 320) is covered at block 474. In one embodiment, covering a reflective sensor may relate to a user's hand operating the mouse.

According to another embodiment, the sensor output may be used to determine one or more operation modes by the controller. When the mouse is not covered ("NO" path out of decision block 474) the controller may determine an operation mode for stand-alone operation of a FM transceiver (e.g., FM transceiver 310) at block 477. When the mouse is covered ("YES" path out of decision block 474) the controller may determine an operation mode for stand-alone operation of a short range wireless communication module (e.g., short range wireless communication module 315) at block 475. In that fashion, the controller can automatically switch from operating in a wireless communication operation mode to a FM transceiver mode upon sensing the removal of a user's hand. As a result, the controller can reduce power consumption of the wireless computer mouse.

Process 470 proceeds to determine if one or more mouse clicks are followed by placement of a user's hand on the sensor at block 476. When the controller does not detect a predetermined sequence of clicks (e.g., "NO" path out of decision block 476) the controller can continue to operate in the current operation mode. When the controller detects a click sequence (e.g., "YES" path out of decision block 476), the controller can override an operation mode at block 478. By way of example, the mouse may be configured to enter into simultaneous operation mode upon sensing a particular input pattern from the user (e.g. placement of a user's hand on the mouse followed by one or more clicks), wherein predetermined periods of time may be associated with each action by the user.

Figure 5:
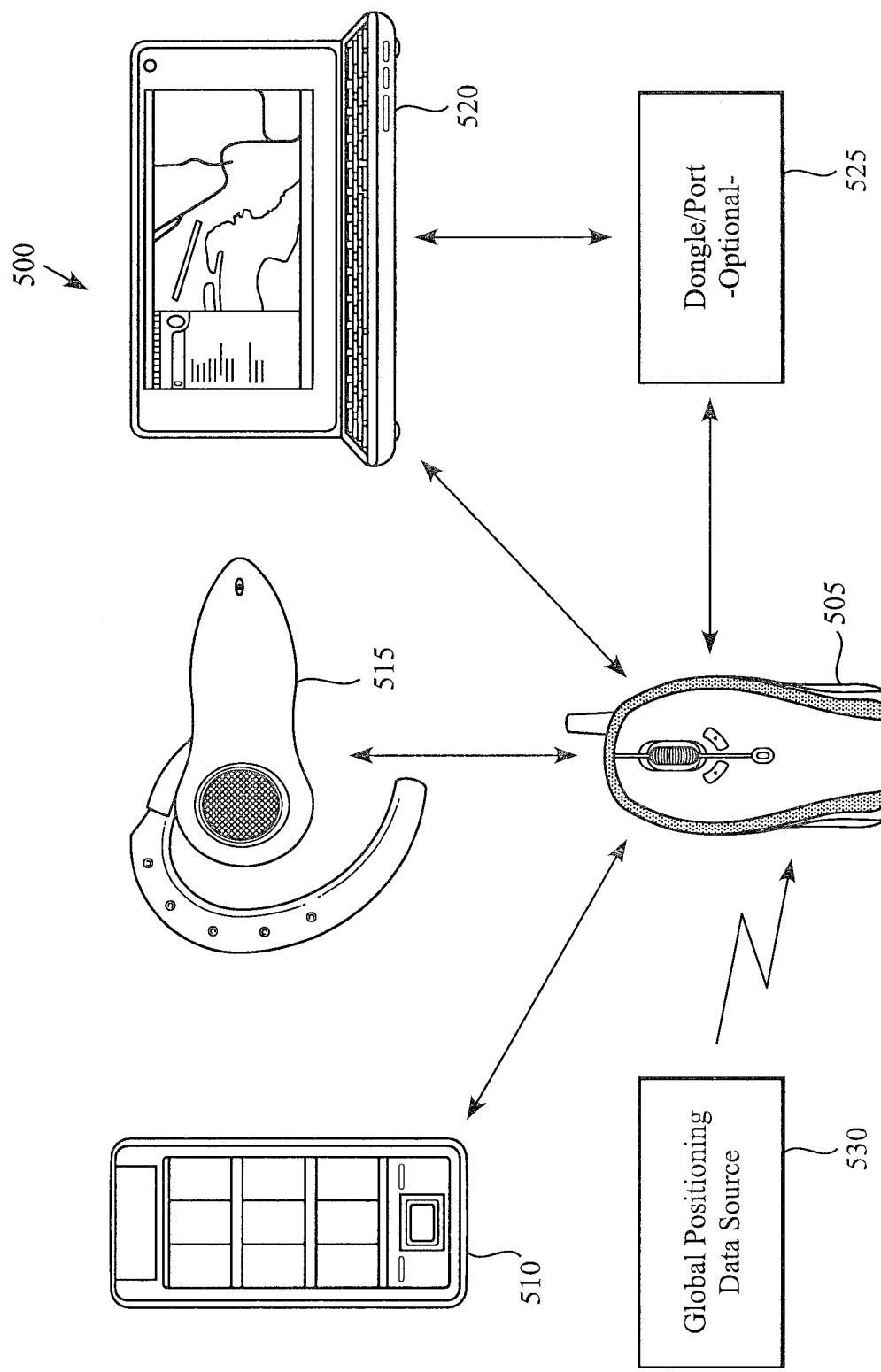
FIG. 5 depicts a system according to one embodiment.

Referring now to FIG. 5, a graphical representation is shown of a system employing the wireless computer mouse of FIGS. 1A-1B according to one embodiment. As shown in FIG. 5, wireless computer mouse 500 (e.g., wireless computer mouse 100) may interoperate with one or more devices including mobile communication device 510, earpiece 515, and computer 520. In one embodiment, wireless computer mouse 500 may communicate using a short range wireless communication protocol (e.g., Bluetooth™). Wireless computer mouse 500 may additionally be configured to receive broadcast FM data 530 from one or more broadcast sources. Accordingly, mouse 505 may be configured to transmit FM data to one or more of mobile communication device 510, earpiece 515, and computer 520. According to another embodiment, wireless computer mouse 500 may be configured to interoperate with one or more devices, such as computer 520, using an optional dongle/port 525 which may be configured for wireless short range communication.

According to another embodiment of the invention, mouse 500 may be configured to transmit FM data to at least one of mobile communication device 510, earpiece 515, and computer 520. One advantage of the invention may be to provide FM data to devices when network connectivity (e.g., WiFi, WWAN, etc.) is not accessible. Further, mouse 500 may be configured to provide FM data to a device using a short range communication protocol when not in use as a user input device as will be described below in more detail with reference to FIG. 6.

Figure 6:
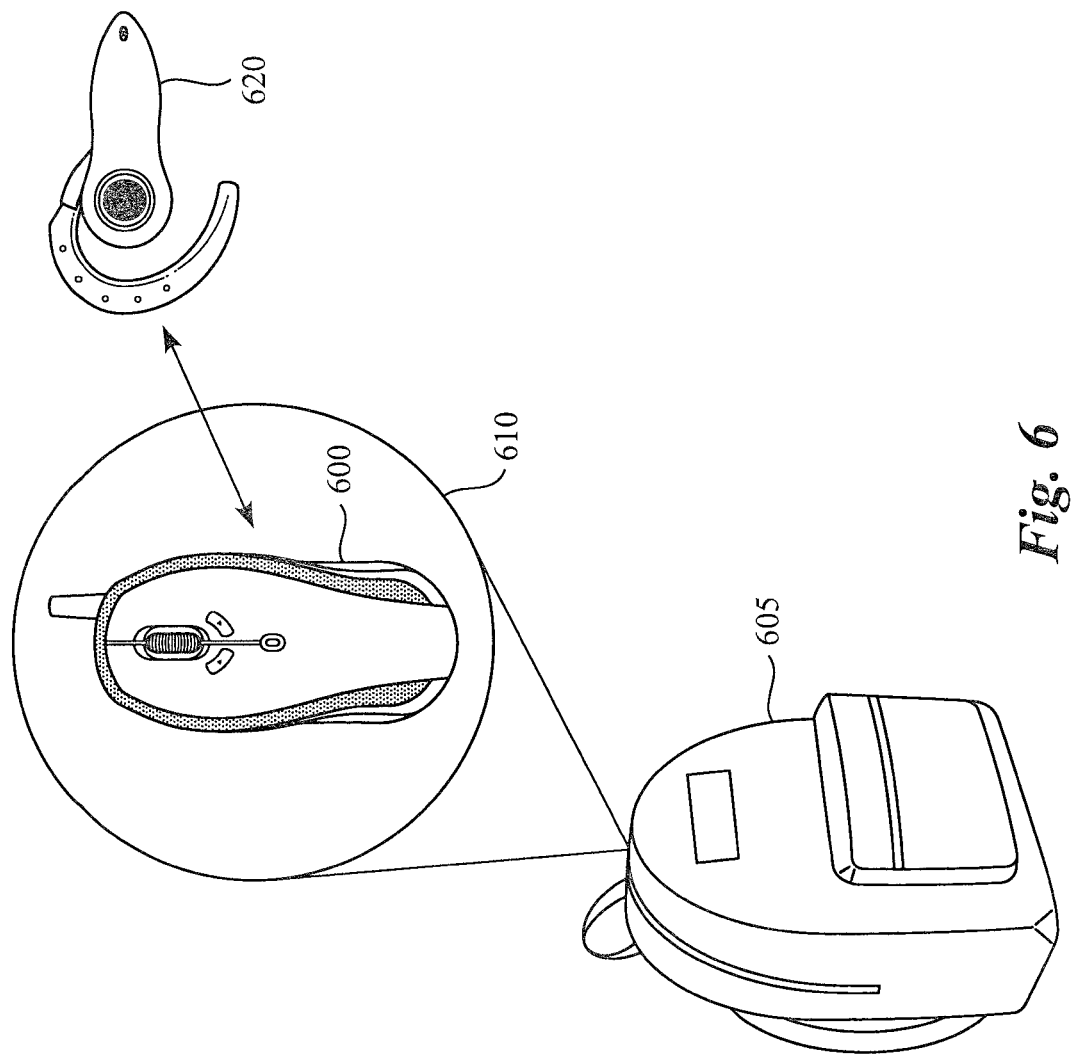
FIG. 6 depicts operation of a wireless computer mouse according to one embodiment.

Referring now to FIG. 6, a graphical representation is shown of the wireless computer mouse of FIGS. 1A-1B according to one embodiment. As shown in FIG. 6, wireless computer mouse 600 (e.g., wireless computer mouse 100) may be configured to transmit FM data to a device while not being used as a computer mouse. Mouse 600 is shown in display window 610 as concealed within bag 605. In another embodiment, mouse 600 may be configured to store received FM data for transmission to an external device at a later time. According to another embodiment, one or more signals received by mouse 600 may initiate transmission of FM data to earpiece 620. In yet another embodiment, mouse 605 may be configured to transmit FM data to earpiece 620 based on one or more button activations by a user of mouse 600.

According to another embodiment, a FM transceiver (e.g., FM transceiver 310) of mouse 600 may be configured to receive broadcast media including audio data, news, update information, etc. In that fashion, mouse 600 may provide the media to a user via earpiece 620 using a short range wireless communication module of the mouse (e.g., wireless communication module 315).

Although FIG. 6 has been described as communication between a mouse 600 and a earpiece 620, it should equally be appreciated that mouse 600 may be configured to interoperate with one or more other devices including a computer (e.g., computer 420), mobile communication device, media player and other devices in general.

Figure 7:
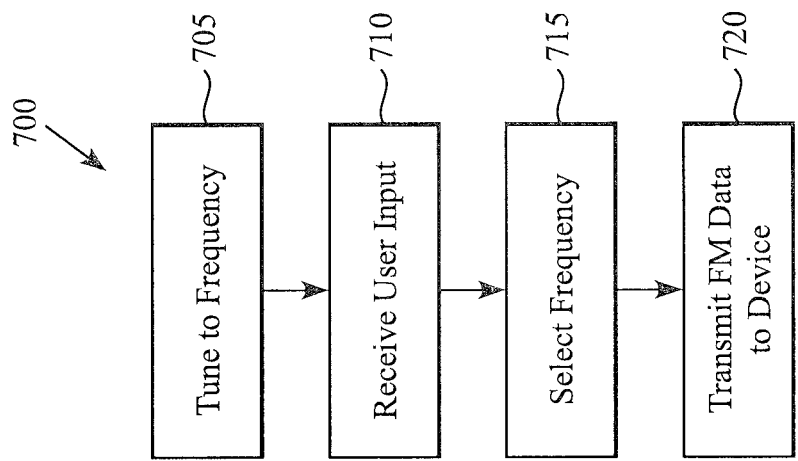
FIG. 7 depicts a process according to one or more embodiments.

Referring now to FIG. 7, a process is depicted for operation of a wireless computer mouse (e.g., wireless computer mouse 100) according to one or more embodiments of the invention. Process 700 may be initiated during an FM transceiver operation mode. The FM transceiver of the mouse can tune to a frequency or channel at block 705. The selected frequency/channel may relate to a previously tuned to frequency by a user and/or a preset frequency/channel. Based on received user input, such as click of a mouse button or scroll wheel at block 710, the FM transceiver can change the frequency/channel selected at block 715. In certain embodiments, the FM transceiver can search for frequencies that exceed a predefined signal strength. It may also be appreciated that certain frequency presets may be stored by the mouse (e.g., mouse 100) based on one or more user inputs to the mouse. The selected frequency at block 715 may be displayed to the user on a display window of the mouse (e.g., display window 111). At block 720, the FM transceiver can output received FM data to a device (e.g., device 620).

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for wireless computer mouse operation, the method comprising:
    receiving a user detection signal from a sensor of the wireless computer mouse to determine at least one of the presence of a user or the absence of the user;
    determining an operation mode of the wireless computer mouse, by a controller, based, at least in part, on the user detection signal;
    enabling, by the controller, operation of a FM transceiver of the wireless computer mouse in response to the operation mode being based on the absence of the user; and
    disabling, by the controller, operation of a short range wireless communication module of the wireless computer mouse in response to the operation mode being based on the absence of the user.

2. The method of claim 1, further comprising:
    receiving, by the FM transceiver, FM broadcast data associated with at least one broadcast signal; and
    transmitting the FM broadcast data by the wireless computer mouse to a peripheral device.

3. A method for wireless computer mouse operation, the method comprising:
    receiving a user detection signal from a sensor of the wireless computer mouse to determine the presence of a user;
    determining an operation mode of the wireless computer mouse, by a controller, based, at least in part, on the user detection signal;
    enabling, by the controller, operation of a short range wireless communication module of the wireless computer mouse in response to the operation mode being based on the presence of the user; and disabling, by the controller, operation of a FM transceiver of the wireless computer mouse in response to the operation mode being based on the presence of the user.

4. A wireless computer mouse comprising:
a sensor configured to detect the presence of a user;
a FM transceiver configured to receive broadcast data;
a short range wireless communication module configured to communicate with a computing device; and
a controller coupled to the a FM transceiver, short range wireless communication module and sensor, the controller configured to:
- receive a user detection signal from the sensor indicating that a user is not present,
- determine an operation mode of the wireless computer mouse based, at least in part, on the user detection signal, and
- disable operation of the short range wireless communication module, and enable operation of the FM transceiver based on the determined operation mode based, at least in part, on the user detection signal indicating that a user is not present.

5. A wireless computer mouse comprising:
a sensor configured to detect the presence of a user;
a FM transceiver configured to receive broadcast data;
a short range wireless communication module configured to communicate with a computing device; and
a controller coupled to the a FM transceiver, short range wireless communication module and sensor, the controller configured to:
- receive a user detection signal from the sensor indicating the presence of a user,
- determine an operation mode of the wireless computer mouse based, at least in part, on the user detection signal, and
- disable operation of the FM transceiver and enable operation of the short range wireless communication module when the user detection signal indicates the presence of a user.

* * * * *